United States Patent [19]

Turner

[11] 4,235,047
[45] Nov. 25, 1980

[54] ARMORED DOOR OPENER FOR FIELD ARTILLERY AMMUNITION SUPPORT VEHICLE

[75] Inventor: John Turner, York, Pa.

[73] Assignee: Harsco Corporation, Wormleysburg, Pa.

[21] Appl. No.: 39,172

[22] Filed: May 15, 1979

[51] Int. Cl.³ .............................................. E05D 7/00
[52] U.S. Cl. ...................................... 49/371; 49/199; 49/206; 49/386; 296/56
[58] Field of Search .......... 49/386, 199, 200, 204–206, 49/371; 296/56, 57 A

[56] References Cited

U.S. PATENT DOCUMENTS

| | | | |
|---|---|---|---|
| 2,698,173 | 12/1954 | Rydell | 49/386 X |
| 2,711,343 | 6/1955 | Falk et al. | 296/56 X |
| 2,808,625 | 10/1957 | Wilkinson | 49/386 X |
| 3,815,950 | 6/1974 | McKenzie et al. | 296/56 |
| 4,094,158 | 6/1978 | Levere et al. | 49/199 X |

FOREIGN PATENT DOCUMENTS 653125  2/1963  Italy ........................................ 49/386

Primary Examiner—Philip C. Kannan
Attorney, Agent, or Firm—Kerkam, Stowell, Kondracki & Clarke

[57] ABSTRACT

The armored door of a field artillery ammunition support vehicle has a door opener on each side of the door, the door being hinged at the top to the top of the vehicle for movement into raised substantially horizontal position to supply added protection for crew members. Each door opener includes a cylinder pivoted at its bottom to the floor of the vehicle with a rod actuated compression spring in the cylinder. The upper end of the rod is pivoted to the end of an arm and the arm is in turn pivoted to an extension from the door opening into the vehicle body. The other end of the arm is pivoted to a link which in turn is pivoted at its other end to the interior of the door. On opening of the door the spring which is compressed assists in raising the weight of the door and on closing of the door the spring compresses countering the downward action of the weight of the door. In door close position the four pivots are aligned on the axis of the cylinder and rod to assist in holding the door in closed position. The door may be provided with conventional manually actuable locking means and be extended at its bottom by a pair of doors hinged to the vehicle body on vertical axes for lateral outward movement for further protection of the crew and shiplap joints are provided between the doors for waterproofness.

3 Claims, 3 Drawing Figures

ARMORED DOOR OPENER FOR FIELD ARTILLERY AMMUNITION SUPPORT VEHICLE

REFERENCE TO RELATED APPLICATION

The present invention relates to an armored door opener for a field artillery ammunition support vehicle of the type disclosed and claimed in pending application Ser. No. 032,908 filed Apr. 24, 1979 by John Turner et al for FIELD ARTILLERY AMMUNITION SUPPORT VEHICLE, both applications being owned by Harsco Corporation.

BACKGROUND OF THE INVENTION

A search of the records of the Patent and Trademark Office prior to the preparation of this application failed to develop prior art for armored door openers for field artillery ammunition support vehicles but did develop U.S. Pat. Nos. 2,711,343 and 3,815,950 in Class 296, Subclass 56 showing the use of compression springs in door openers and further developed U.S. Pat. No. 4,094,158 of June 13, 1979 and assigned to the United States of America. This patent relates to a loading gate for mine roof bolter apparatus in which a gate 10 is raised to horizontal position by an hydraulic cylinder 51 acting on a pivoted arm 38 connected to the door by link 40 to hold the door either in raised position or in fully closed position with the door in raised position acting as a crew shield. The door actuater of this patent requires hydraulic power to drive the piston in cylinder 51 to either open or close the door and the door cannot be raised or lowered manually. In this patent, when the door is closed the pivots are not aligned for security and an over-the-center arrangement is required between the arms 40 and 38 to assure locking of the door in raised position.

The present invention provides the advantages of manual actuation of a very heavy armored door either to fully raised position or to closed position without danger to the operator and with substantially all of the weight of the door compensated for by the arrangement of the compression spring and pivots which are aligned when the door is closed so that no opening force is applied to the closed door although the springs are at maximum compression. With this arrangement, as the door begins to open the spring pivot points become slightly offset from the fixed pivots providing sufficient force to further open the door. This offset increases as does the opening force until the door is horizontal or substantially horizontal. No hydraulic power is required for opening or closing the door.

BRIEF DESCRIPTION OF THE ACCOMPANYING DRAWINGS

In the accompanying drawings, in which like reference characters indicate like parts, a preferred embodiment of the armored door opener for a field artillery ammunition support vehicle is shown; and FIG. 1 is a rear view of the ammunition support vehicle showing the door partially broken away to show the door openers disposed within the vehicle;

FIG. 2 is a cross-sectional view on the line 2—2 of FIG. 1 showing a door opener in door closed position in solid line and showing the door opener in door raised position in broken line; and FIG. 3 is a view from above of a portion of the vehicle showing the door in raised position

DESCRIPTION OF THE PREFERRED EMBODIMENT

Figure 1:
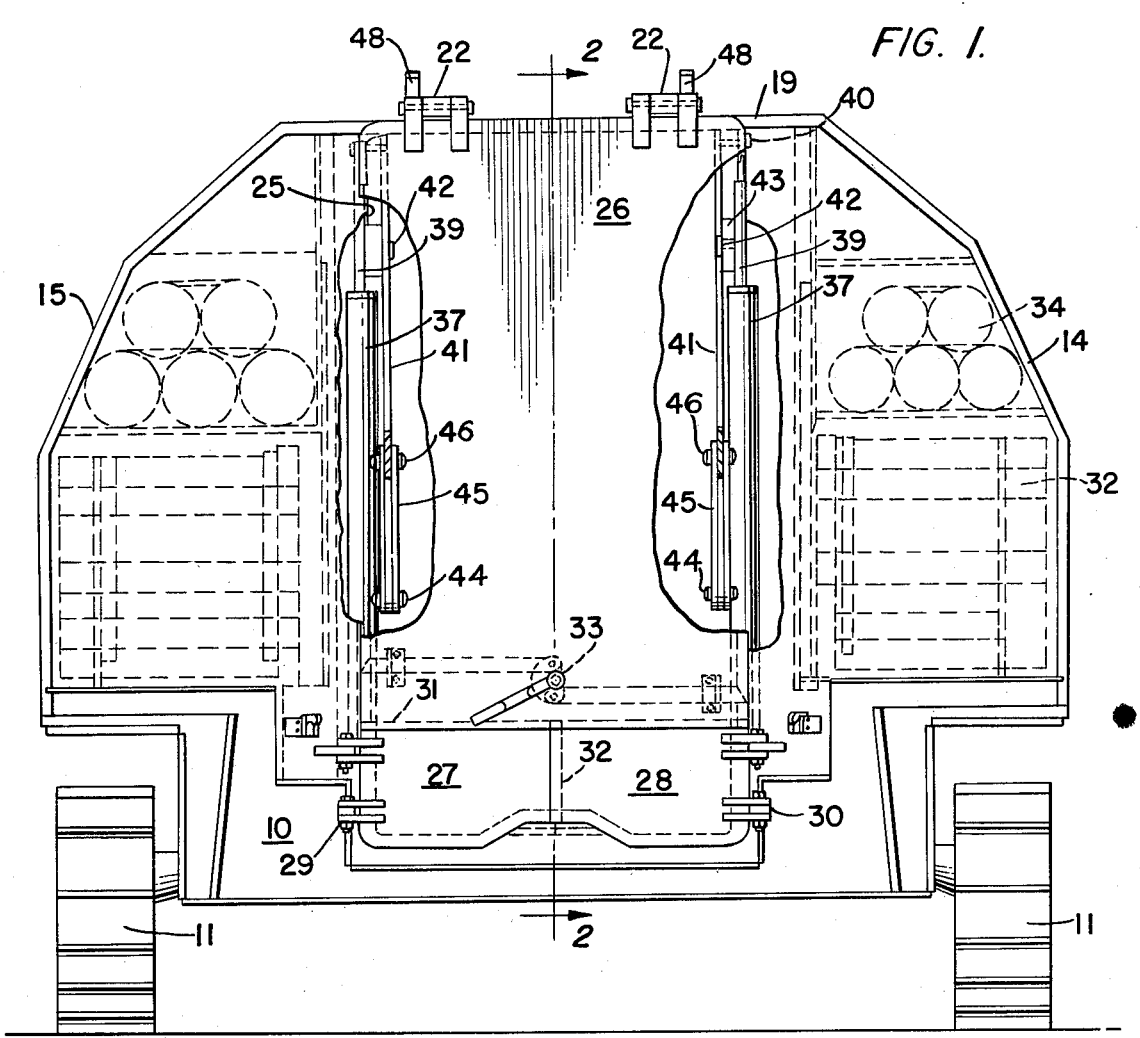
Figure 3:
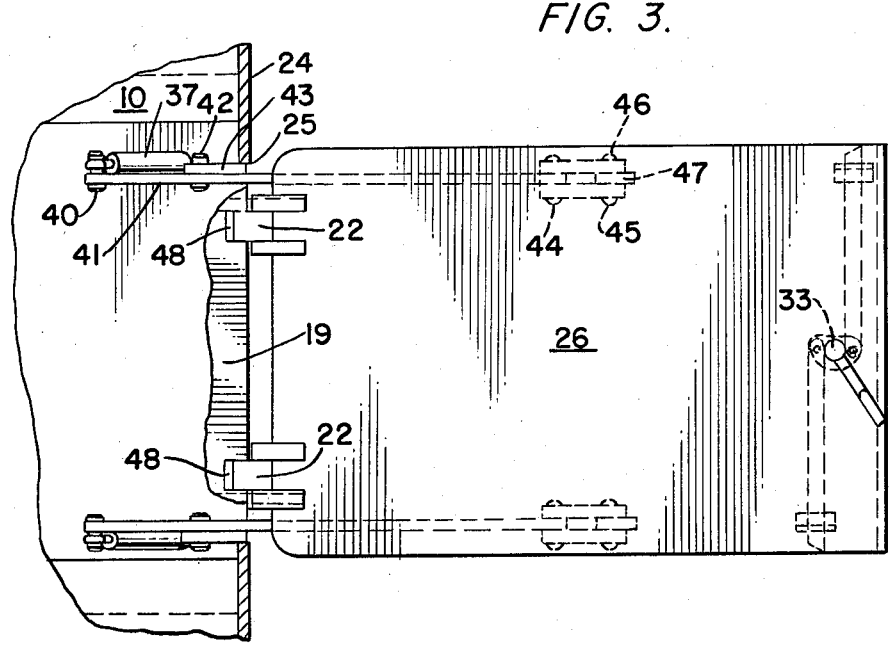

Referring now to the drawings, the field artillery ammunition support vehicle is a self-propelled armored vehicle having an armored body 10 mounted on crawlers 11, the body having sides 14 and 15 and top 19. The rear wall 24 of body 10 has a vertically disposed aperture 25 at least partially closed by door 26 when the door is in lowered position and door 26 is hinged to top 19 by hinges 22 having horizontal pivots. The lower portion of door opening 25 may be closed by doors 27 and 28 hinged at 29 and 30 to body 10 with hinges 29 and 30 pivoting on vertical axes. A ship-lap joint 32 is provided between door 27 and 28 and a ship-lap joint 31 is provided between door 26 and doors 27 and 28 for water-tightness.

The interior of the vehicle may be provided with bins to receive separate loading projectiles as at 34 across the forward end of body 10 and may be provided with laterally extending compartments to receive separate loading powder charges such as 32.

As noted above, two door openers are employed, one at each side of the door and these door openers are identical. Hence, a description of one door opener will suffice for both door openers.

Figure 2:
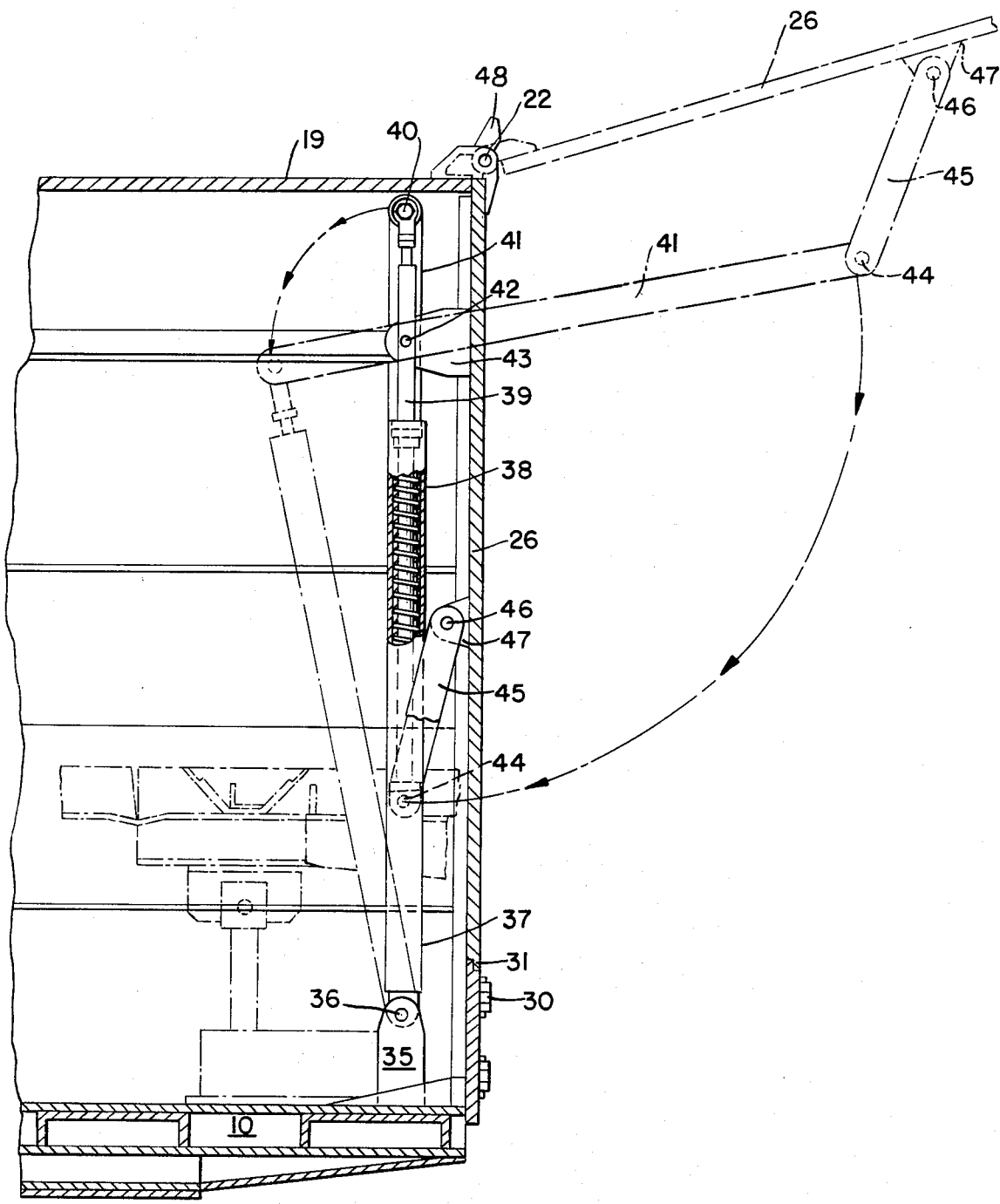

Particularly with reference to FIG. 2, the door opener at the right of FIG. 1 is shown in solid line in the closed position and includes an upstanding plate 35 secured to the floor of body 10 and mounting a pivot 36 for the lower end of cylinder 37. Compression spring 38 is mounted in cylinder 37 and is actuated by rod 39 which is suitably secured to the lower end of spring 38. Rod 39 has upper pivot 40 which connects it to arm 41 and arm 41 is pivoted at 42 to ear 43 which is welded at the inside of opening 25 and extends into the vehicle body. The other end of arm 41 is pivoted at 44 to link 45 and link 45 is pivotally connected at 46 to ear 47 which is welded to door 26.

As is clearly seen in FIG. 2, when door 26 is in closed position, pivots 36, 44, 42, and 40 are in line with the axis of cylinder 37 and spring 38 is under compression. Thus, compression spring 38 applies an increasing opening force necessary to open the door even though the spring is decompressing as the door opens. With the pivot points in line no opening force is applied to the door by the spring although under maximum compression. When the door is unlocked using any suitable manually actuatable latch or lock 33 and slightly opened, the spring pivot points become offset from the fixed pivots and the spring provides force sufficient to further open the door. This offset increases as does the opening force exerted by the spring until the door is raised so that minimum physical force by a crew member is required to open the door. Opening movement of the door may be limited by stops 48 mounted on hinges 22.

The reverse action is true when door 26 is to be closed. Minimum effort by a crew member alone is required to start door 26 swinging downwardly about hinges 22 at which time spring 38 begins to compress and the pivots to move toward alignment thus providing the necessary resistance to the weight of the heavy door for easy and safe downward movement to closed position.

When doors 27 and 28 are in closed position and when door 26 is in lowered position, latch 33 may be manually actuated to lock all three doors in closed position so that ship-lapped joints 31 and 32 may provide watertightness.

When door 26 is in raised position and when doors 27 and 28 are opened outwardly, additional armored protection is provided for the crew working in the ammunition support vehicle to supply separate loading ammunition to the field artillery weapon.

I claim:

1. A field artillery ammunition support vehicle comprising an armored body, an armored door closing a rear opening in said body, hinges having horizontal pivots mounting said door to a top of said body for vertical swinging movement of said door to a raised substantially horizontal position, and at least one door opener for said door disposed within said body and adjacent a side of said opening comprising a cylinder pivoted at an end thereof to a floor of said body and extending upwardly therein, a compression spring in said cylinder, a rod in said cylinder compressing said spring as said door is closed, and arm pivoted to said rod, a pivot for said arm on said body adjacent said opening, said arm rotating about said pivot and through said opening as said door is raised, a link pivoted to an outer end of said arm and a fifth pivot on said door connecting said link to said door, said opener being so constructed and arranged that said pivots but for said fifth pivot are aligned in an axis of said cylinder when said door is closed whereby said spring applies an increasing opening force as said door is opened necessary to open said door.

2. A vehicle as described in claim 1, said at least one door opener including a door opener adjacent each of spaced sides of said opening.

3. A vehicle as described in claim 1 including a pair of doors closing a lower portion of said rear opening, hinges for said doors with vertical pivots mounting said door on said body, a vertical ship-lap joint between said doors and a horizontal ship-lap joint between said armored door and said pair of doors.

* * * * *